US010333375B2

(12) United States Patent
Nakazawa

(10) Patent No.: US 10,333,375 B2
(45) Date of Patent: Jun. 25, 2019

(54) ELECTRIC MOTOR HAVING BALANCE STRUCTURE AND MACHINE TOOL EQUIPPED WITH THE ELECTRIC MOTOR

(71) Applicant: FANUC CORPORATION, Yamanashi (JP)

(72) Inventor: Yasuyuki Nakazawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 256 days.

(21) Appl. No.: 15/600,821

(22) Filed: May 22, 2017

(65) Prior Publication Data

US 2017/0346362 A1 Nov. 30, 2017

(30) Foreign Application Priority Data

May 25, 2016 (JP) ................................. 2016-104665

(51) Int. Cl.
*H02K 15/16* (2006.01)
*F16F 15/22* (2006.01)
(Continued)

(52) U.S. Cl.
CPC ........... *H02K 15/165* (2013.01); *F16F 15/22* (2013.01); *F16F 15/322* (2013.01); *H02K 5/04* (2013.01);
(Continued)

(58) Field of Classification Search
CPC .......... H02K 5/24; H02K 15/165; H02K 9/16; H02K 5/04; H02K 5/10; F16F 15/322; F16F 15/22
See application file for complete search history.

(56) References Cited

U.S. PATENT DOCUMENTS

| 2,558,737 | A | * | 7/1951 | Darnell | ................ F16F 15/324 |
| | | | | | 310/51 |
| 5,235,228 | A | | 8/1993 | Nakanura et al. | |

(Continued)

FOREIGN PATENT DOCUMENTS

| JP | S60-069301 U1 | 5/1985 |
| JP | H02-060456 A | 2/1990 |

(Continued)

OTHER PUBLICATIONS

An Office Action; "Notice of Reasons for Refusal," issued by the Japanese Patent Office dated May 8, 2018, which corresponds to Japanese Patent Application No. 2016-104665 and is related to U.S. Appl. No. 15/600,821.

*Primary Examiner* — Mohamad A Musleh
(74) *Attorney, Agent, or Firm* — Studebaker & Brackett PC

(57) ABSTRACT

To provide an electric motor enabling easy and high-precision balance correction, and a machine toll including this electric motor. An electric motor (1) includes: a cylindrical stator (2); a rotor (3) having a rotary shaft part (31) inserted inside of the stator (2); a housing (4) installed to both ends in an axial direction of the stator (2); an opening (51*a*) provided in at least one outer peripheral lateral face of the housing (4), and disposed to be separated from an internal space (S) of the stator (2) and a ventilation passage (9) formed in the stator (2); and a balance correction component (6, 61) that is installed to the rotary shaft part (31), and corrects balance of the rotor (3), in which the balance correction component (61) is exposed to outside from the opening (51*a*); and a machine tool (10) includes this electric motor (1).

16 Claims, 23 Drawing Sheets

(51) Int. Cl.
*H02K 5/10* (2006.01)
*H02K 5/24* (2006.01)
*H02K 5/04* (2006.01)
*H02K 9/16* (2006.01)
*F16F 15/32* (2006.01)

(52) U.S. Cl.
CPC ............... *H02K 5/10* (2013.01); *H02K 5/24* (2013.01); *H02K 9/16* (2013.01)

(56) References Cited

U.S. PATENT DOCUMENTS

| | | | |
|---|---|---|---|
| 5,487,640 A * | 1/1996 | Shaffer | F01D 5/027 29/447 |
| 6,078,115 A * | 6/2000 | Uchida | B23Q 5/10 310/58 |
| 10,224,791 B2 * | 3/2019 | Nakazawa | H02K 15/14 |
| 2011/0109176 A1 | 5/2011 | Yoshimura et al. | |

FOREIGN PATENT DOCUMENTS

| | | |
|---|---|---|
| JP | 2716237 B2 | 2/1998 |
| JP | 2004-204748 A | 7/2004 |
| JP | 4787351 B2 | 10/2011 |
| JP | 2013-158114 A | 8/2013 |
| JP | 2016-082629 A | 5/2016 |

\* cited by examiner

ELECTRIC MOTOR HAVING BALANCE STRUCTURE AND MACHINE TOOL EQUIPPED WITH THE ELECTRIC MOTOR

This application is based on and claims the benefit of priority from Japanese Patent Application No. 2016-104665, filed on 25 May 2016, the content of which is incorporated herein by reference.

BACKGROUND OF THE INVENTION

Field of the Invention

The present invention relates to an electric motor having a balance structure, and a machine tool equipped with this electric motor.

Related Art

In recent years, increases in the revolution speed of the spindle of machine tools has progressed, and to match this, increases in the revolution speed increase of the electric motor coupled to the spindle has also progressed. In electric motors rotating at high speed, it is necessary to balance correct the rotor with high precision so that vibrations do not become excessive during high-speed rotation. For this reason, electric motors having various balance structures have been proposed (for example, refer to Patent Documents 1 and 2).

Patent Document 1: Japanese Patent No. 2716237
Patent Document 2: Japanese Patent No. 4787351

SUMMARY OF THE INVENTION

However, balance correction of the rotor is usually performed prior to assembly of the electric motor. Additionally, balance correcting (field balance) the rotor is important even after assembly of the electric motor or after coupling with the spindle. Furthermore, it is important to make re-correction of balance such as in the case of the vibration gradually worsening in an electric motor that operates for a long term.

To address this, with the electric motor of Patent Document 1, a labyrinth structure with a tap for balance correction is provided to a front part of the electric motor, and since this rebalance structure is exposed to the outside of the electric motor, balance correction becomes possible by installing a set screw or the like in the tap from the outside. However, when coupling an electric motor to the spindle or the like of a machine tool, since the labyrinth structure will be arranged within the spindle head, balance correction has not been possible after coupling.

In addition, with the electric motor of Patent Document 2, a tap for balance correction is provided to a heat dissipating disk provided to the back part of the electric motor, and balance correction becomes possible by installing a set screw of the like. However, a cooling fan or the like is mounted to the back part of the electric motor, and thus the tap for balance correction provided to a heat dissipating disk is not exposed to outside of the electric motor. For this reason, balance correction has not been possible without removing and disassembling the cooling fan, etc.

The present invention has been made taking account of the above, and the object thereof is to provide an electric motor enabling easy and high-precision balance correction, and a machine tool equipped with this electric motor.

(1) In order to achieve the above-mentioned object, the present invention provides an electric motor (for example, the electric motor 1, 1A, 1B, 1C, 1D describes later) including: a cylindrical stator (for example, the stator 2 described later); a rotor (for example, the rotor 3 described later) having a rotary shaft part (for example, the rotary shaft part 31 described later) inserted inside of the stator; a housing (for example, the housing 4, front housing 41, back housing 42 described later) installed to both ends in an axial direction of the stator; an opening (for example, the opening 51*a*, 52*a*, 53*a*, 51*b*, 52*b*, 53*b*, 54*b* described later) provided in at least one outer peripheral lateral face of the housing, and disposed to be separated from an internal space (for example, the internal space S described later) of the stator and a ventilation passage (for example, the ventilation passage 9 described later) formed in the stator; and a balance correction component (for example, the first balance correction component 61 and second balance correction component 62 serving as the balance correction component 6 described later) that is installed to the rotary shaft part, and corrects balance of the rotor, in which the balance correction component is exposed to outside from the opening.

(2) In the electric motor as described in (1), the housing may be a polygonal tube shape having at least four outer peripheral lateral faces, and the opening may be provided to at least one among the four outer peripheral lateral faces.

(3) In the electric motor as described in (1) or (2), the balance correction component may include, at an outer peripheral lateral face (for example, the outer peripheral lateral face 61*b*, 62*b* described later) thereof, a balance correction part (for example, the second tap 612, 622 described later) which enables balance correction of the rotor.

(4) In the electric motor as described in any one of (1) to (3), the balance correction component may include, at an end face (for example, the axial-direction end face 61*a*, 62*a* described later) in an axial direction thereof, a balance correction part (for example, the first tap 611, 621 described later) which enables balance correction of the rotor.

In addition, the present invention provides a machine tool (for example, the machine tool 10 described later) including the electric motor as described in any one of (1) to (4) aspects.

According to the present invention, it is possible to provide an electric motor enabling easy and high-precision balance correction, and a machine tool equipped with this electric motor.

DETAILED DESCRIPTION OF THE INVENTION

Hereinafter, embodiments of the present invention will be explained in detail while referencing the drawings. It should be noted that, in the explanations of a second embodiment, third embodiment and modified examples, the same reference symbols are assigned for configurations identical to the first embodiment, and corresponding reference symbols with the same regularity are assigned for corresponding configurations, and explanations thereof will be omitted.

First Embodiment

Figure 1:
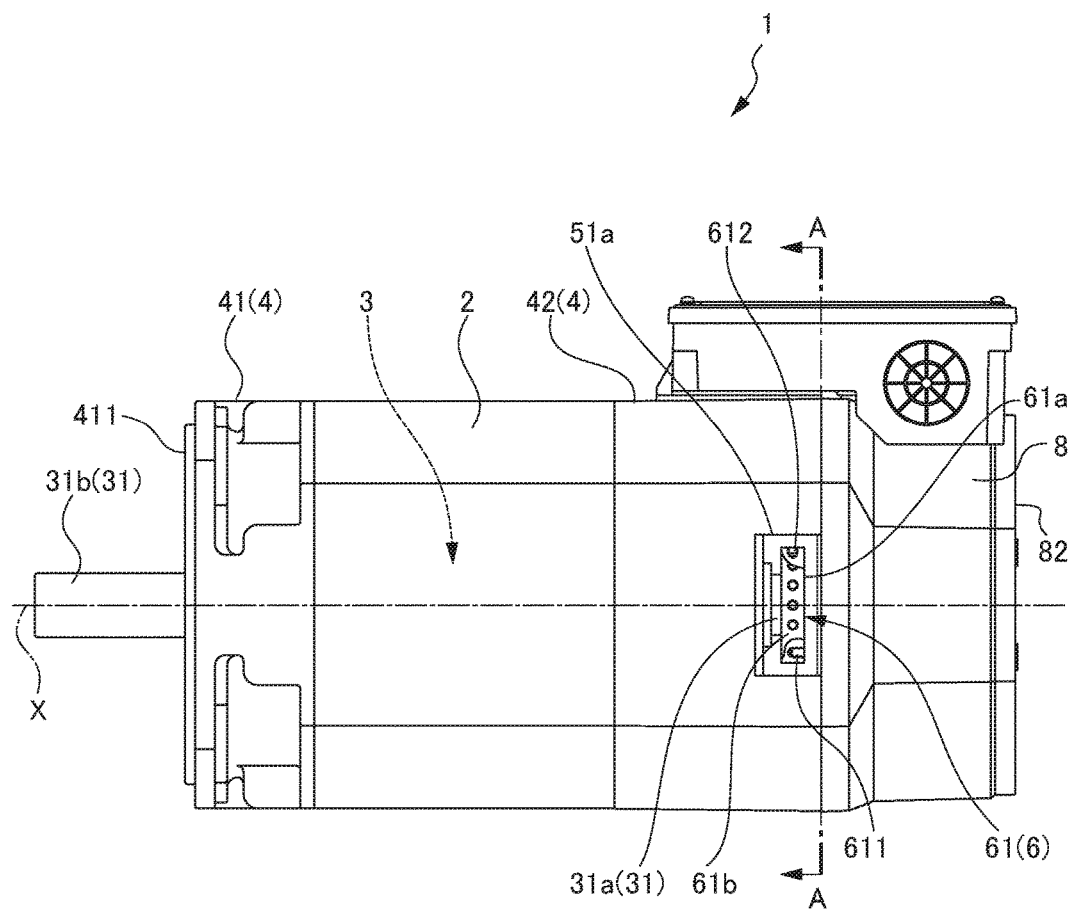
FIG. 1 is a side view of an electric motor according to a first embodiment.
Figure 2:
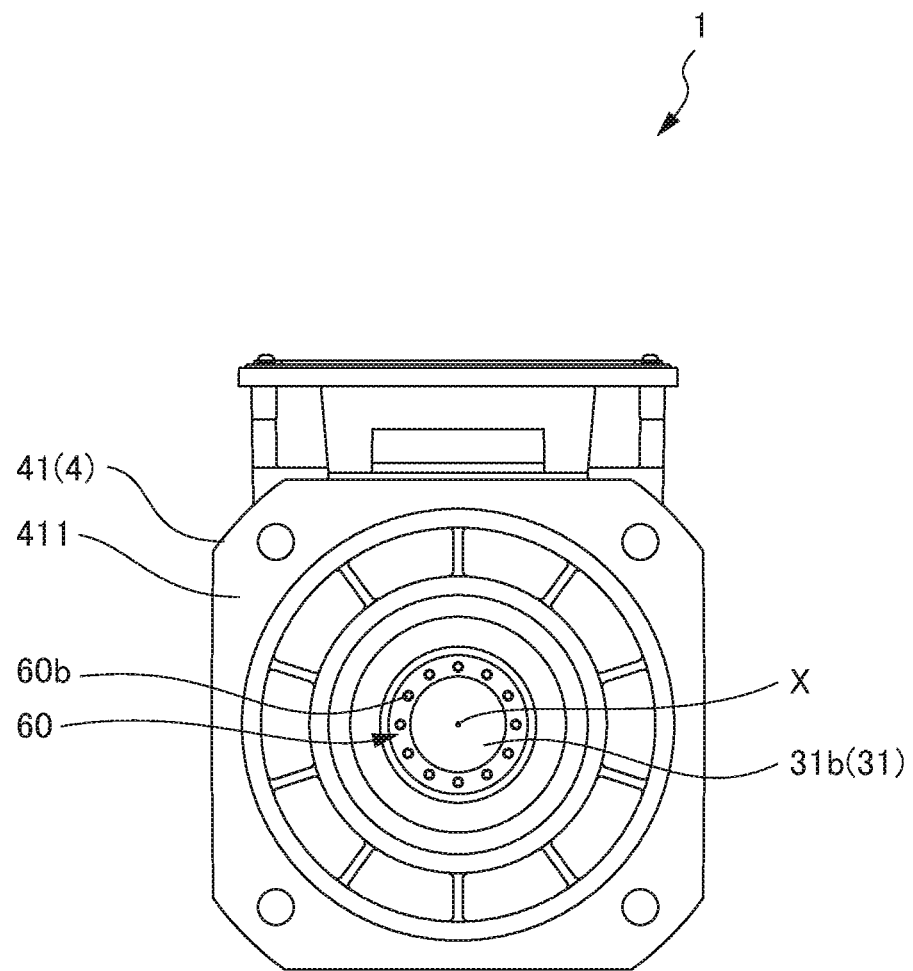
FIG. 2 is a drawing viewing the electric motor according to the first embodiment from forward in the axial direction.
Figure 3:
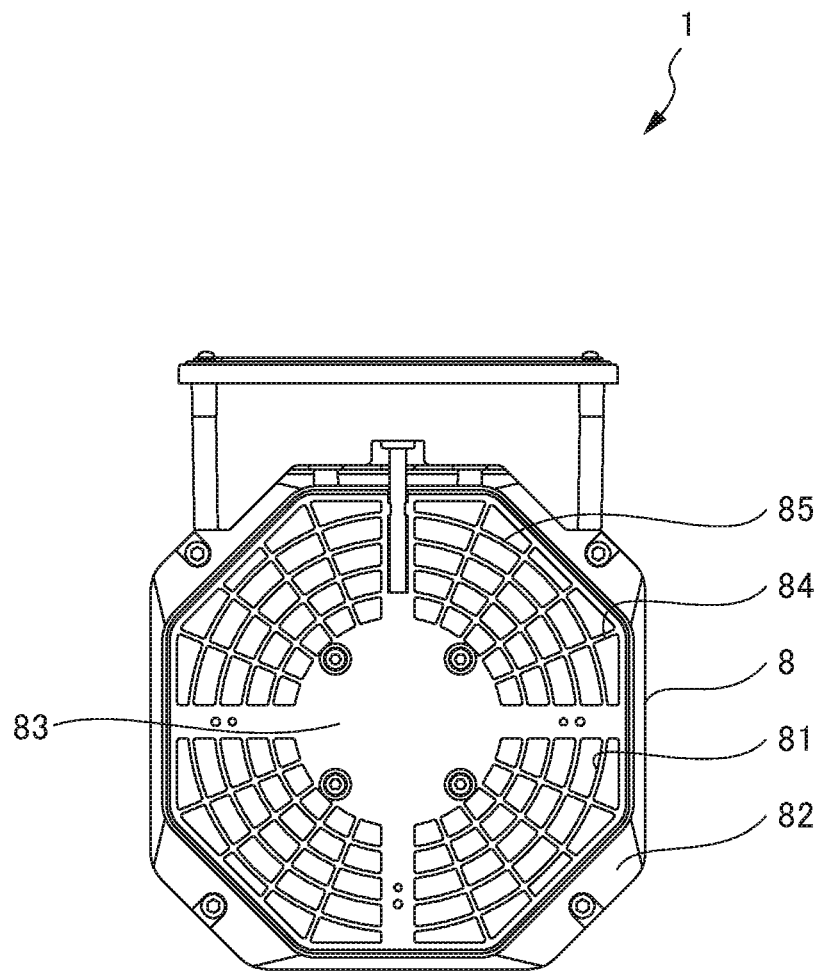
FIG. 3 is a drawing viewing from rearward in the axial direction of the electric motor according to the first embodiment.
Figure 4:
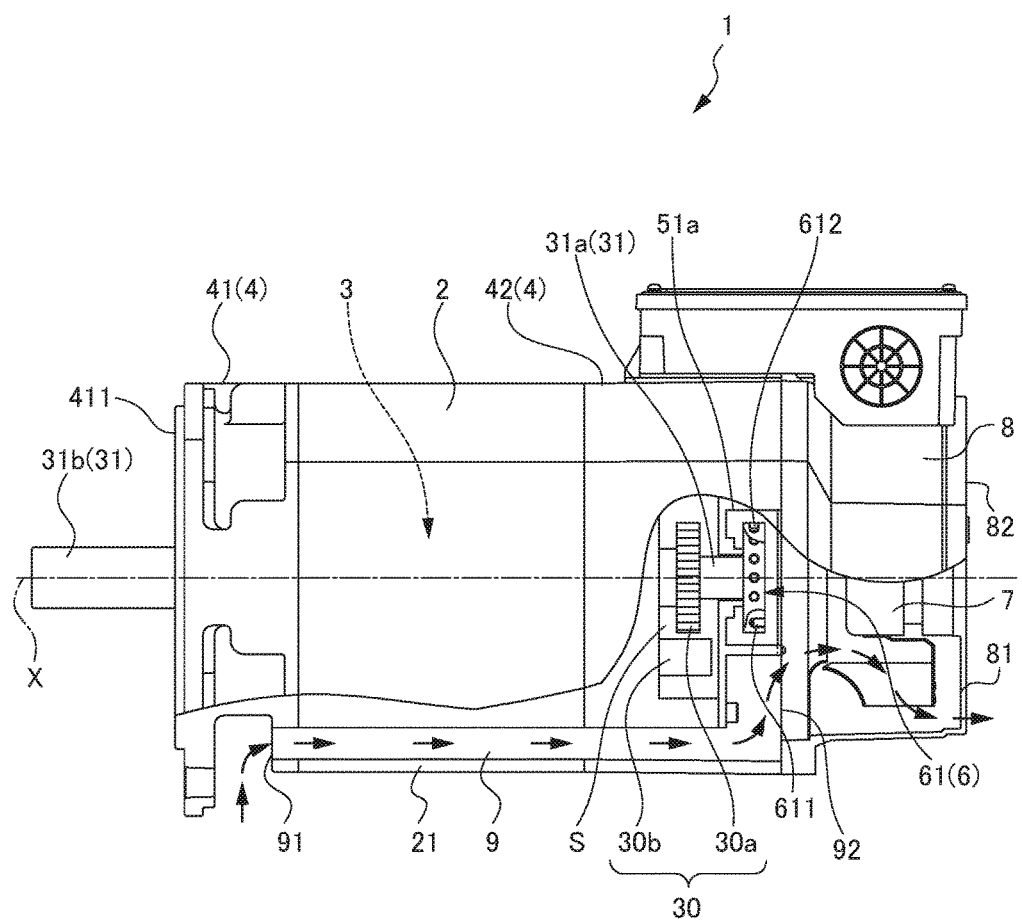
FIG. 4 is a partial cross-sectional view of FIG. 1.
Figure 5:
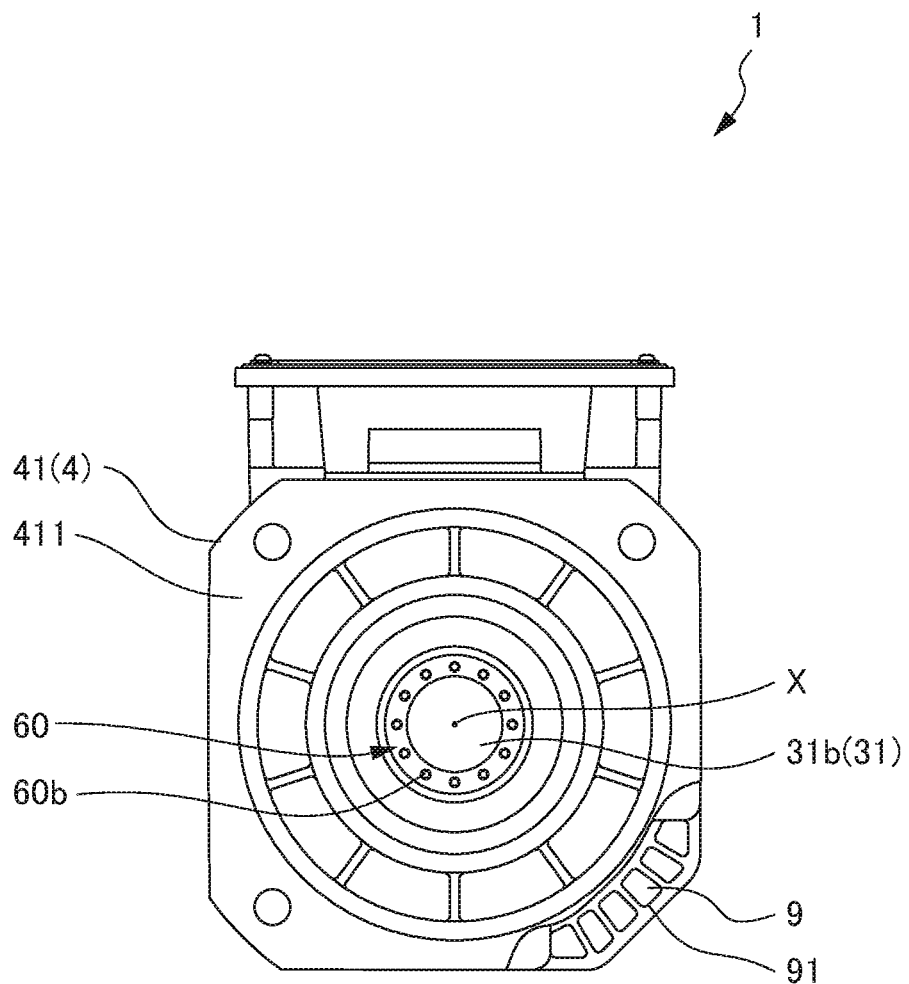
FIG. 5 is a partial cross-sectional view of FIG. 2.
Figure 6:
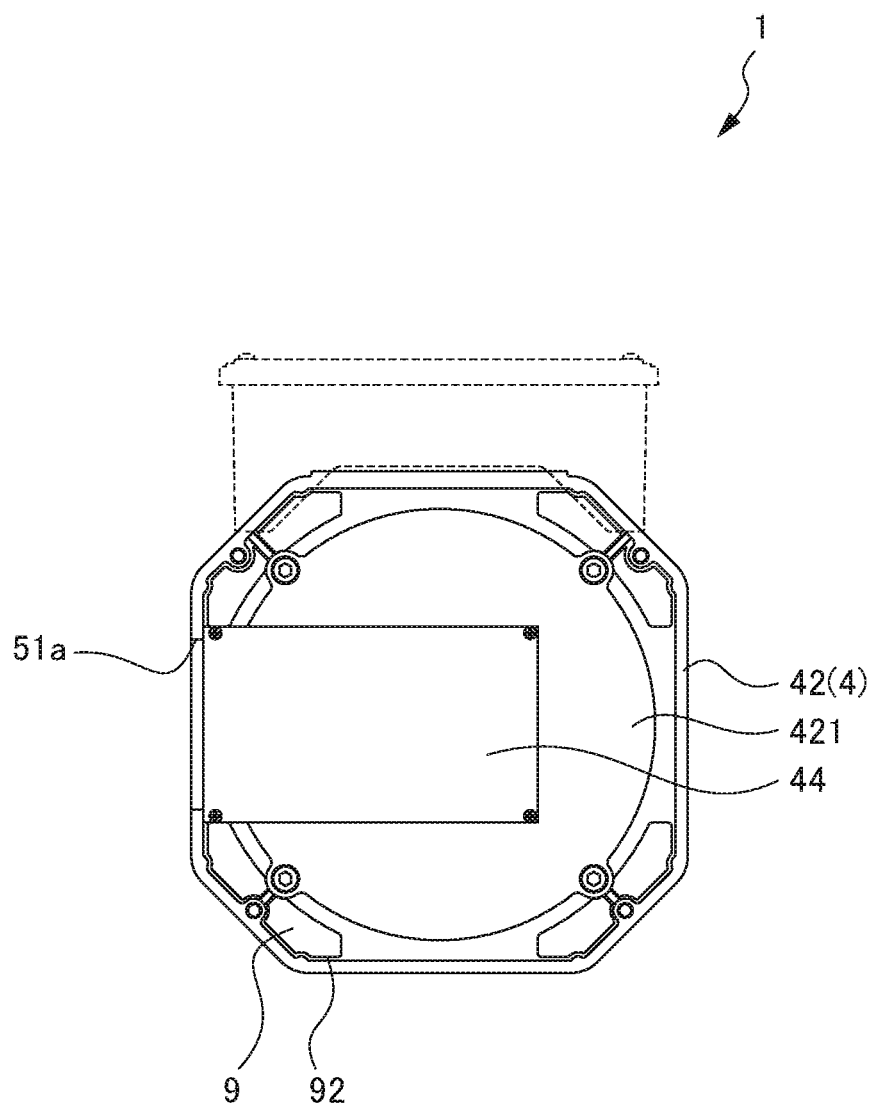
FIG. 6 is a cross-sectional view along the line A-A in FIG. 1.
Figure 7:
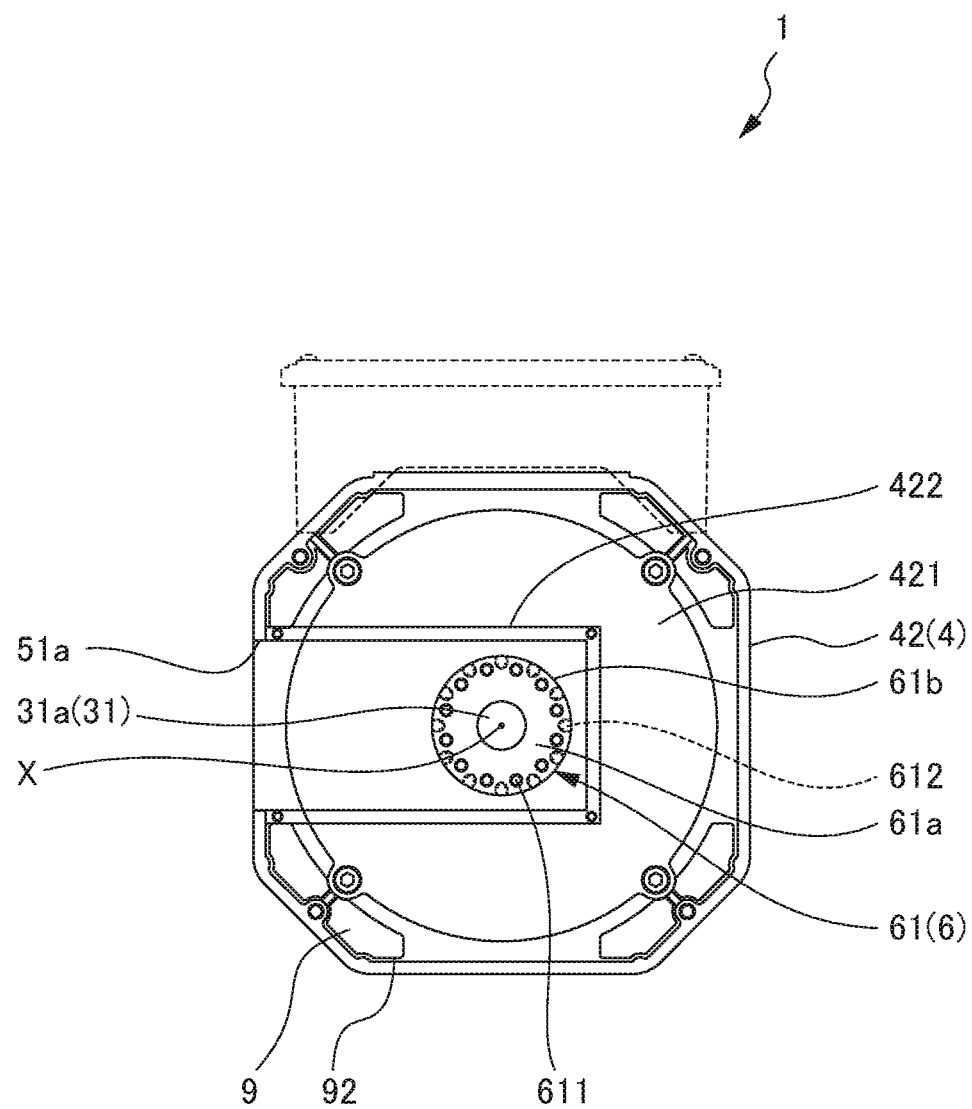
FIG. 7 is a view showing a state removing a first cover member in FIG. 6.
Figure 8:
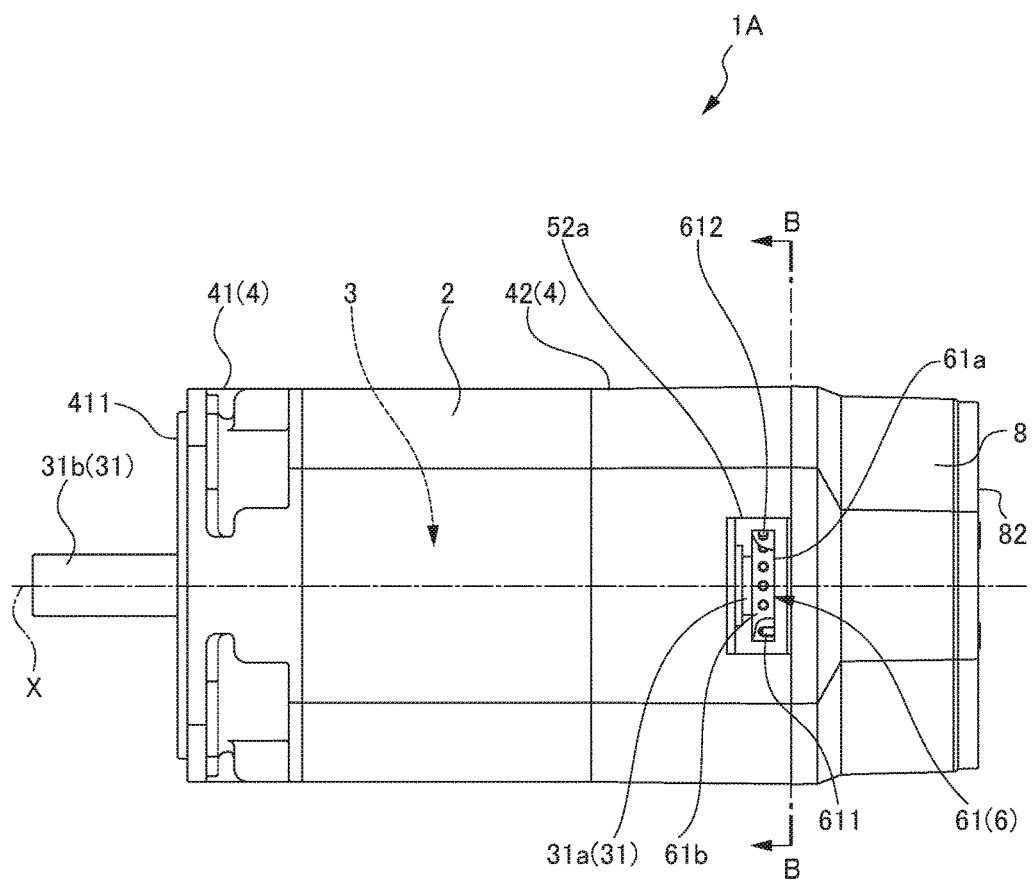
FIG. 8 is a bottom view of an electric motor according to a modified example of the first embodiment.
Figure 9:
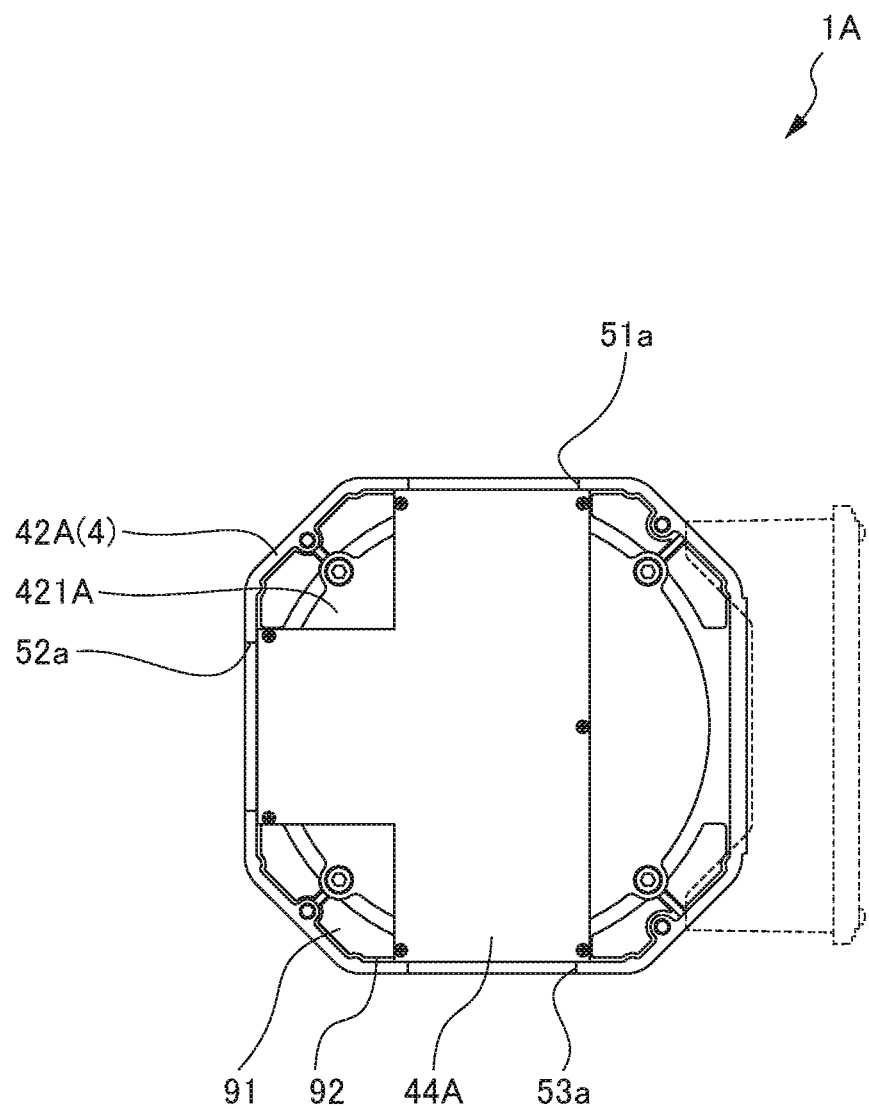
FIG. 9 is a cross-sectional view along the line B-B in FIG. 8.
Figure 10:
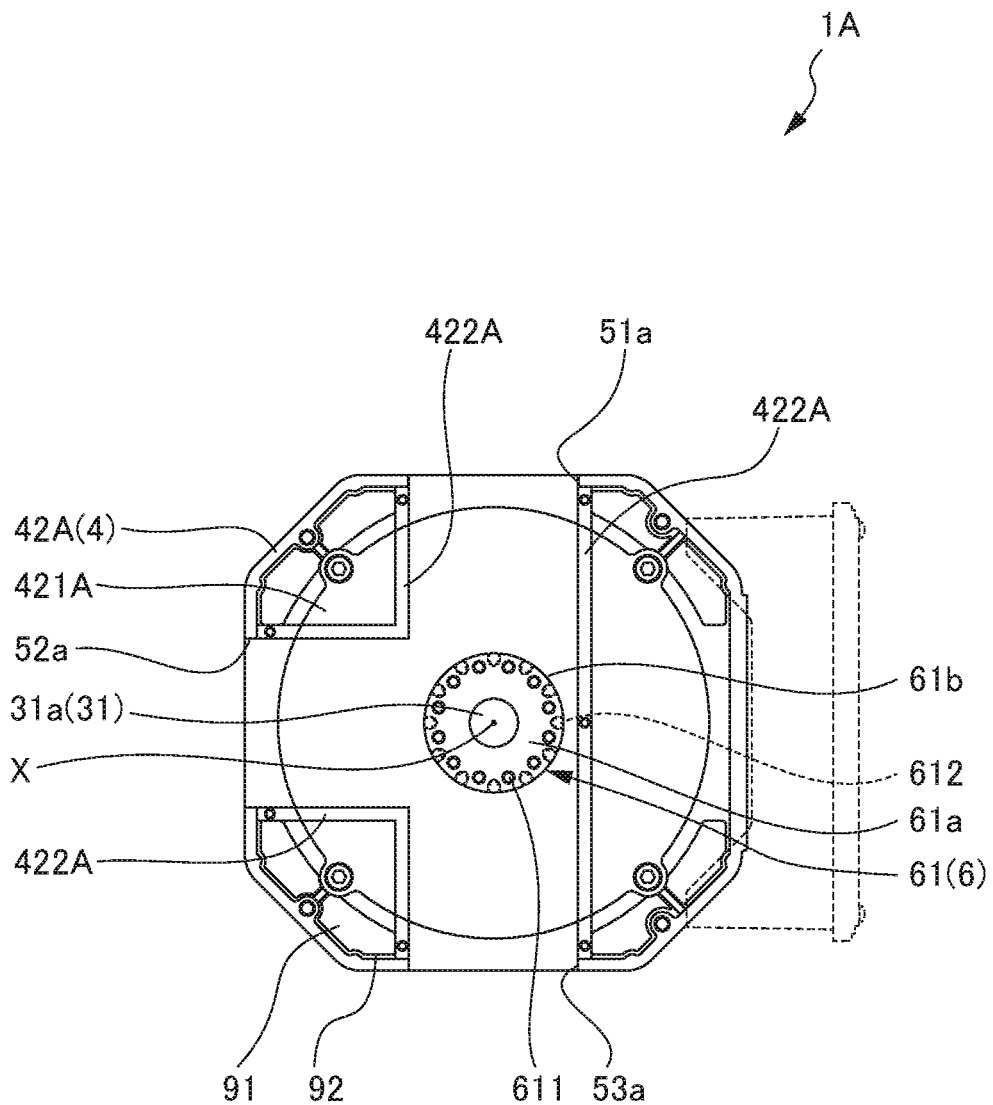
FIG. 10 is a view showing a state removing a first cover member in FIG. 9.
Figure 11:
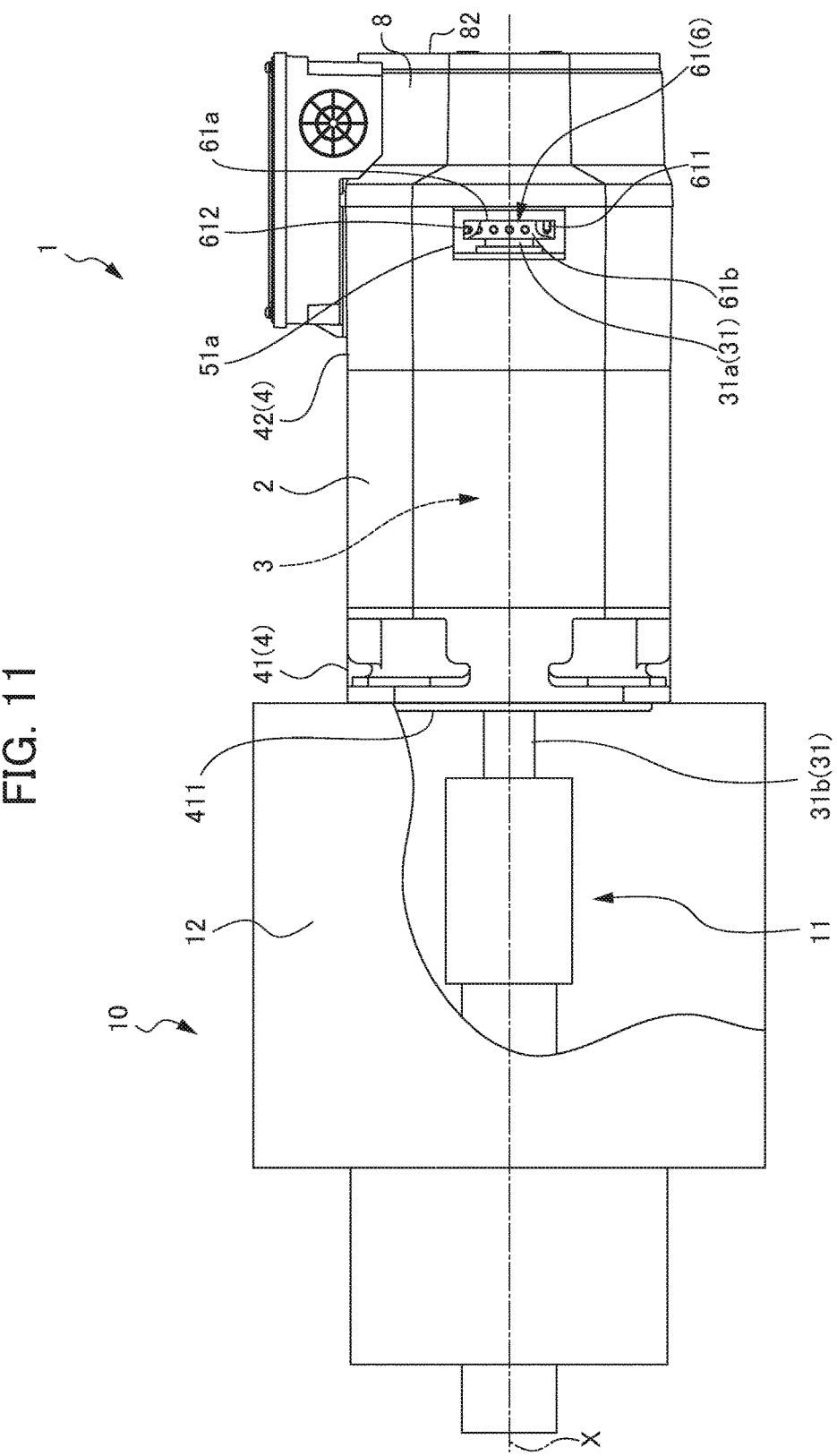
FIG. 11 is a partial sectional side view when coupling the electric motor according to the first embodiment to the spindle of a machine tool.

FIG. 1 is a side view of an electric motor 1 according to a first embodiment; FIG. 2 is a drawing viewing the electric motor 1 according to the first embodiment from forward in the axial direction. FIG. 3 is a drawing viewing the electric motor 1 according to the first embodiment from rearward in the axial direction. FIG. 4 is a partial sectional view of FIG. 1; FIG. 5 is a partial sectional view of FIG. 2; FIG. 6 is a cross-sectional view along the line A-A in FIG. 1; and FIG. 7 is a view showing a state removing a first cover member 44 in FIG. 6. In addition, FIG. 8 is a bottom view of an electric motor 1A according to a modified example of the first embodiment. FIG. 9 is a cross-sectional view along the line B-B in FIG. 8, and FIG. 10 is a view showing a state removing a first cover member 44A of FIG. 9. In addition, FIG. 11 is a partial sectional side view when coupling the electric motor 1 according to the first embodiment to a spindle 11 of a machine tool 10.

Herein, axial direction indicates an axis line X direction of a rotary shaft part 31 of a rotor 3 described later. Forward in the axial direction indicates a side of a spindle mounting face 411 mounted to the spindle 11 of the machine tool 10, and for example, indicates the left side in FIG. 1. In addition, rearward in the axial direction indicates a side of a fan cover 8, and for example, indicates the right side in FIG. 1.

The electric motor 1 according to the present embodiment is an induction electric motor, for example, and has a winding (not illustrated) in a stator 2 described later, has a bare conductor (not illustrated) short-circuited to the rotor 3, and operates by way of the electromagnetic induction effect from the winding to the conductor. This induction electric motor is broadly utilized due to having a simple structure and maintenance also being easy.

As shown in FIGS. 1 to 7, the electric motor 1 according to the present embodiment includes the stator 2, the rotor 3 and a housing 4.

The stator 2 has a cylindrical shape, and the rotor 3 described later is rotatably disposed inside thereof (inner side). The stator 2 is configured by a plurality of magnetic steel sheets laminated in the axial direction. A plurality of slots (not illustrated) arranged at equal intervals in the circumferential direction is formed in a peripheral wall part 21 of the stator 2. Each slot is provided to extend in the axial direction of the stator 2, and a winding (not illustrated) is accommodated therein.

The rotor 3 includes a rotor main body (not illustrated) and the rotary shaft part 31. The rotor main body has a columnar shape, and is provided coaxially relative to the rotary shaft part 31, and fixed to this rotary shaft part 31. The short-circuited bare conductor (not illustrated) is disposed to the rotor main body. The rotary shaft part 31 is rotatably provided to the stator 2, and rotates integrally with the rotor main body. The rotary shaft part 31 is configured from a first shaft part 31a constituting an axial-direction rearward portion, and a second shaft part 31b constituting an axial-direction forward portion. The first shaft part 31a is rotatably supported by a back housing 42 described later, and the second shaft part 31b is connected to the spindle 11 of the machine tool 10 (refer to FIG. 11).

At the axial-direction rearward part of the electric motor 1, a rotation detection part 30 that detects the revolution speed of the rotor 3 is provided (refer to FIG. 4). This rotation detection part 30 is configured by a gear-shaped detection rotating element 30a mounted to the first shaft part 31a, and a rotation detector 30b that detects the revolution speed of this detection rotating element 30a.

The housing 4 is installed to both ends in the axial direction of the stator 2, and supports the stator 2. The housing 4 has a front housing 41 installed ahead in the axial direction of the stator 2, and the back housing 42 installed behind in the axial direction of the stator 2.

The housing, i.e. front housing 41 and back housing 42, both have a substantial square tubular shape, and have four main outer peripheral lateral faces. In other words, these housings have two lateral faces (for example, surface parallel to bottom side in FIG. 1), a top surface (for example, upper surface in FIG. 1), and a bottom surface (for example, lower surface in FIG. 1). In addition, these housings have four corners that are chamfered.

The front housing 41 is fixed to a front part in the axial direction of the stator 2. A spindle head 12 of the machine tool 10 described later is connected to the spindle mounting face 411 on the forward side in the axial direction of the front housing 41 (refer to FIG. 11). A labyrinth member 60 of a labyrinth structure is provided to the side of the spindle mounting face 411 of the front housing 41. This labyrinth member 60 prevents oil, etc. in the environmental atmosphere from penetrating inside the electric motor 1. In addition, this labyrinth member 60 has an annular shape, and has a plurality of taps 60b for balance correction formed at equal intervals in the circumferential direction and extending in the axial direction. Although not illustrated, by adjusting the weight, number and arrangement of set screws installed to the taps 60b, balance correction of the electric motor 1 becomes possible.

The back housing 42 is fixed to a rear part in the axial direction of the stator 2. At the end face 421 at a rear side in the axial direction of the back housing 42, the first cover member 44 is mounted to be fixed so as to cover the rear side in the axial direction of an opening 51a described later (refer to FIG. 6), and a fan cover 8 accommodating a cooling fan 7 described later is mounted via this first cover member 44. Among the outer peripheral lateral faces of the back housing 42, the opening 51a is provided in the lateral face on one side (for example, lateral face at near side when viewed on paper in FIG. 1). In addition, a first balance correction component 61 serving as a balance correction component 6 is arranged at a position exposed to the outside from this opening 51a. This opening 51a and balance correction component 6 will be described in detail at a later stage.

However, in an induction electric motor such as the electric motor 1 of the present embodiment, the stator 2 and/or rotor 3 generate heat in principle of operation. Therefore, for maintaining performance, the electric motor 1 includes, as the cooling structure, a cooling fan 7, fan cover 8, and ventilation passage 9.

The cooling fan 7 is arranged at a rearward side in the axial direction of the electric motor 1, and is mounted to the back housing 42 (refer to FIG. 4). The cooling fan 7 is a centrifugal-type fan, for example, and generates air flow in the axial direction by rotating by way of the driving of a fan motor (not illustrated).

The fan cover 8 is mounted to the back housing 42, and accommodates the cooling fan 7 inside thereof. A plurality of fan holes 81 enabling the influx of ambient air to the inside and efflux of air from the inside thereof is provided in the fan cover 8. In more detail, the fan holes 81 are formed to be demarcated by a circular central part 83 positioned at the center, a plurality of radial ribs 84 extending radially from the outer circumference of this central part 83, and a plurality of ring-shaped annular ribs 85 of different diameter, in a back end face 82 in the axial direction of the fan cover 8.

The ventilation passage 9 is formed by through holes penetrating in the axial direction in the peripheral wall part 21 of the stator 2 (refer to FIGS. 4 and 5). A plurality of the ventilation passages 9 is formed to be aligned in the circumferential direction in the peripheral wall part 21 of the stator 2. An inlet 91 is formed at a forward side in the axial direction of the ventilation passage 9, and an outlet 92 is formed at a rearward side in the axial direction.

As shown by the arrows in FIG. 4, when the cooling fan 5 rotates by way of driving of the fan motor, airflow generates in the axial direction and ambient air flows in from the inlet 91. The ambient air flowing in circulates inside of the ventilation passage 9 towards rearwards in the axial direction and flows out from the outlet 92, and then is discharged from the fan hole 81 through the inside of the fan cover 8. The stator 2 and/or the rotor 3, via the stator 2, which generate heat from operation of the electric motor 1, thereby become coolable.

Next, the opening 51a and balance correction component 6 will be explained in detail. The opening 51a is provided to the lateral face on one side among the outer periphery lateral faces of the back housing 42. In a side view, the size of the opening of the opening 51a is set to be larger than the first balance correction component 61 described later. In other words, the first balance correction component 61 is exposed to outside from the opening 51a, and becomes visible and accessible from the lateral face.

In addition, the opening 51a is configured by a recessed part formed in an end face 421 on a rearward side in the axial direction of the back housing 42 to be surrounded by a partition wall 422 provided to as to enclose the first balance correction component 61 described later, and the first cover member 44 of rectangular shape (refer to FIGS. 6 and 7). The partition wall 422 is formed to extend a predetermined length rearwards in the axial direction, and the first balance correction component 61 described later is accommodated in this recessed part. In other words, the opening 51a is separated from both an internal space S of the stator 2, and the ventilation passages 9 formed in the stator 2. The negative influences on the waterproof performance and cooling performance of the electric motor 1 are thereby avoided.

The first balance correction component 61 serving as the balance correction component 6 is mounted to the first shaft part 31a constituting the axial-direction rearward portion of the rotary shaft part 31. The first balance correction component 61 has a circular disk shape, and is disposed coaxially with the rotary shaft part 31. It should be noted that, in FIG. 1, etc., the first balance correction component 61 is partially shown in the cross-section for convenience.

At the end face 61a at the rearward side in the axial direction of the first balance correction component 61, a plurality of first taps 611 extending in the axial direction is provided at equal intervals in the circumferential direction, and the balance of the rotor 3 is corrected by adjusting the weight, number and arrangement of set screws (not illustrated) installed.

In addition, at the outer peripheral lateral face 61b of the first balance correction component 61, a plurality of second taps 612 extending in the radial direction is provided at equal intervals in the circumferential direction, and the balance of the rotor 3 is corrected by adjusting the weight, number and arrangement of set screws (not illustrated) installed.

The electric motor 1 including the above configuration is balance corrected by conducting the following, for example. First, prior to assembly of the electric motor 1, the weight, number and arrangement of set screws installed to the first taps 611 of the first balance correction component 61 are adjusted to correct the balance of the rotor 3. Next, after assembling the electric motor 1, the weight, number and arrangement of set screws installed to the second taps 612 are adjusted by accessing the first balance correction component 61 from the opening 51a to correct the balance of the rotor 3. In addition, even after long-term operating the electric motor 1, it is balance corrected by way of similar operations.

The electric motor 1 including the above configuration can be modified in the number and/or arrangement of openings, as shown in FIGS. 8 to 10. In an electric motor 1A according to this modified example, openings are provided in the three surfaces of the bottom face and both lateral faces among the four outer peripheral lateral faces of the back housing. In other words, in both lateral faces of a back housing 42A of the electric motor 1A, an opening 51a and opening 53a are provided, and an opening 52a is provided in the bottom face. In a side view, for all of the openings, the size of the bore thereof is established to be larger than the first balance correction component 61. In other words, the first balance correction component 61 is exposed to the outside from all of the openings, and becomes visible and accessible from both lateral faces and the bottom face.

These openings 51a, 52a and 53a are formed in recessed parts formed to be surrounded by a partition wall 422A provided so as to enclose the first balance correction component 61, and a first cover member 44A of substantial T-shape, in an end face 421A on a rearward side in the axial direction of the back housing 42A, and are in communication with each other. The partition wall 422A is formed to extend a predetermined length rearwards in the axial direction, and the first balance correction component 61 described later is accommodated within this recessed part. In other words, all of the openings are separated from both the internal space S of the stator 2 and the ventilation passages 9 formed in the stator 2, whereby the negative influences on the waterproof performance and cooling performance of the electric motor 1 are avoided.

According to the present embodiment, the following effects are exerted. In the present embodiment, at least one opening 51a (52a, 53a) arranged to be separated from the internal space S of the stator 2 and the ventilation passages 9 formed in the stator 2 is provided in an outer peripheral lateral face of the back housing 42. In addition, the first balance correction component 61 that corrects the balance of the rotor 3 is installed to the rotary shaft part 31 of the rotor 3, and is arranged so as to expose the first balance correction component 61 from the opening 51a (52a, 53a). It is thereby possible to correct the balance of the electric motor 1 (1A) easily and with high precision, without removing the cooling fan 7 or fan cover 8, after assembly of the electric motor 1 (1A) or after long-term operation. In addition, since the opening 51a (52a, 53a) is separated from the internal space S and the ventilation passages 9 of the stator 2, it is possible to avoid a decline in the waterproof performance and cooling performance of the electric motor 1 (1A).

Second Embodiment

Figure 12:
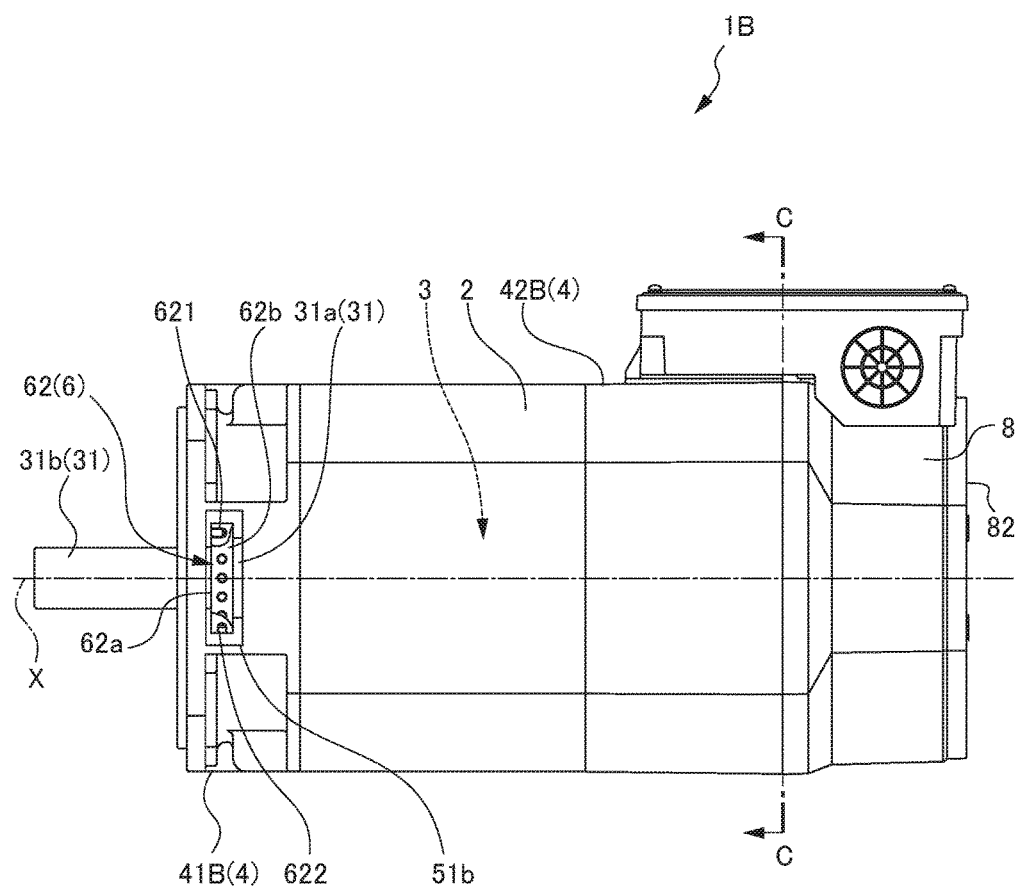
FIG. 12 is a side view of an electric motor according to a second embodiment.
Figure 13:
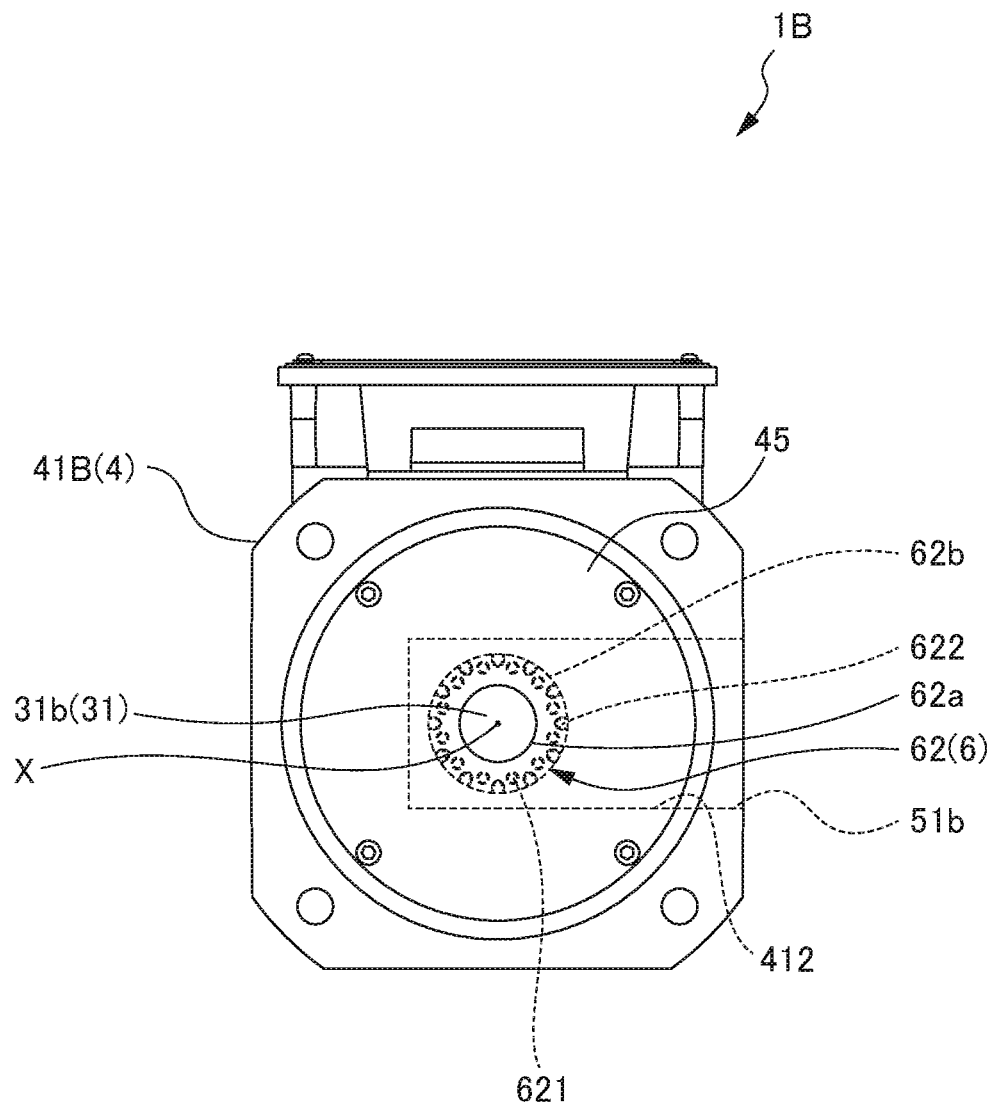
FIG. 13 is a drawing viewing the electric motor according to the second embodiment from forward in the axial direction.
Figure 14:
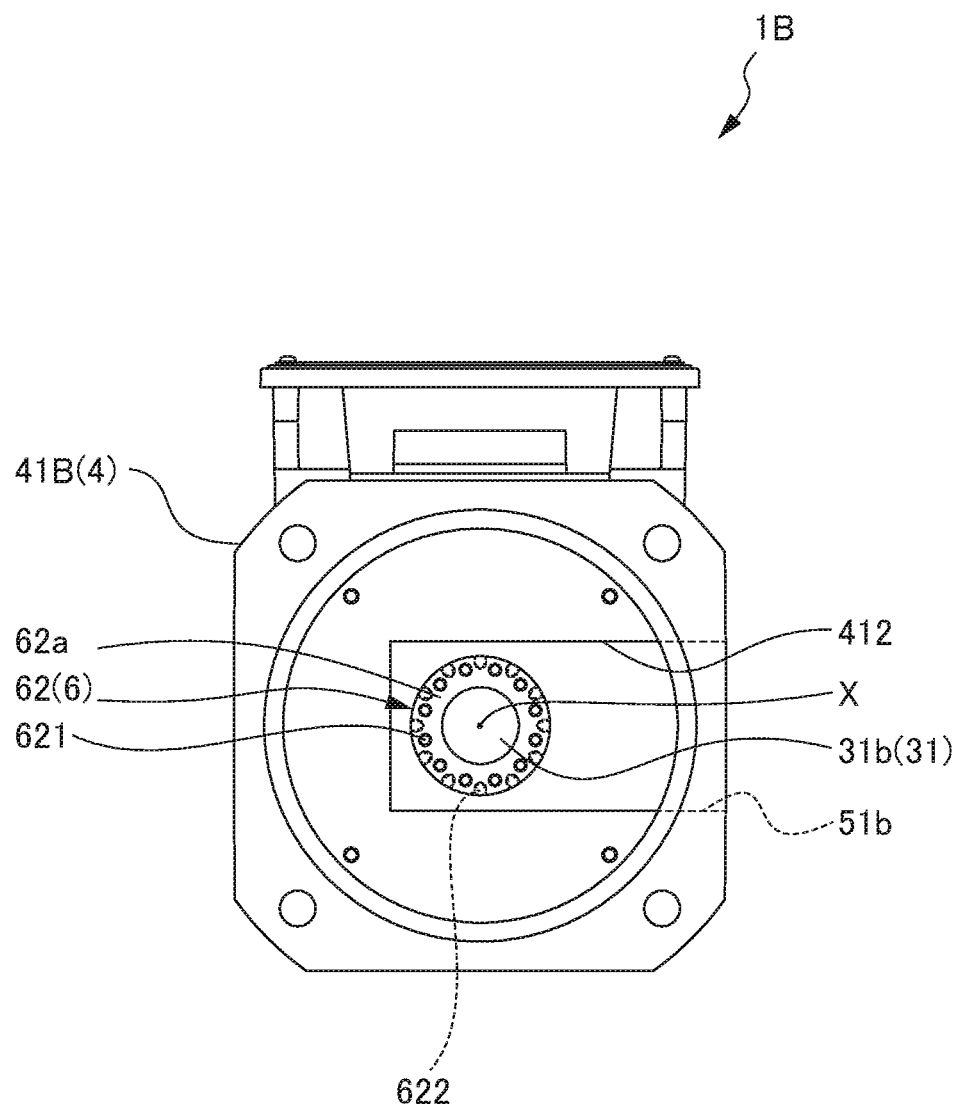
FIG. 14 is a view showing a state removing a second cover member in FIG. 13.
Figure 15:
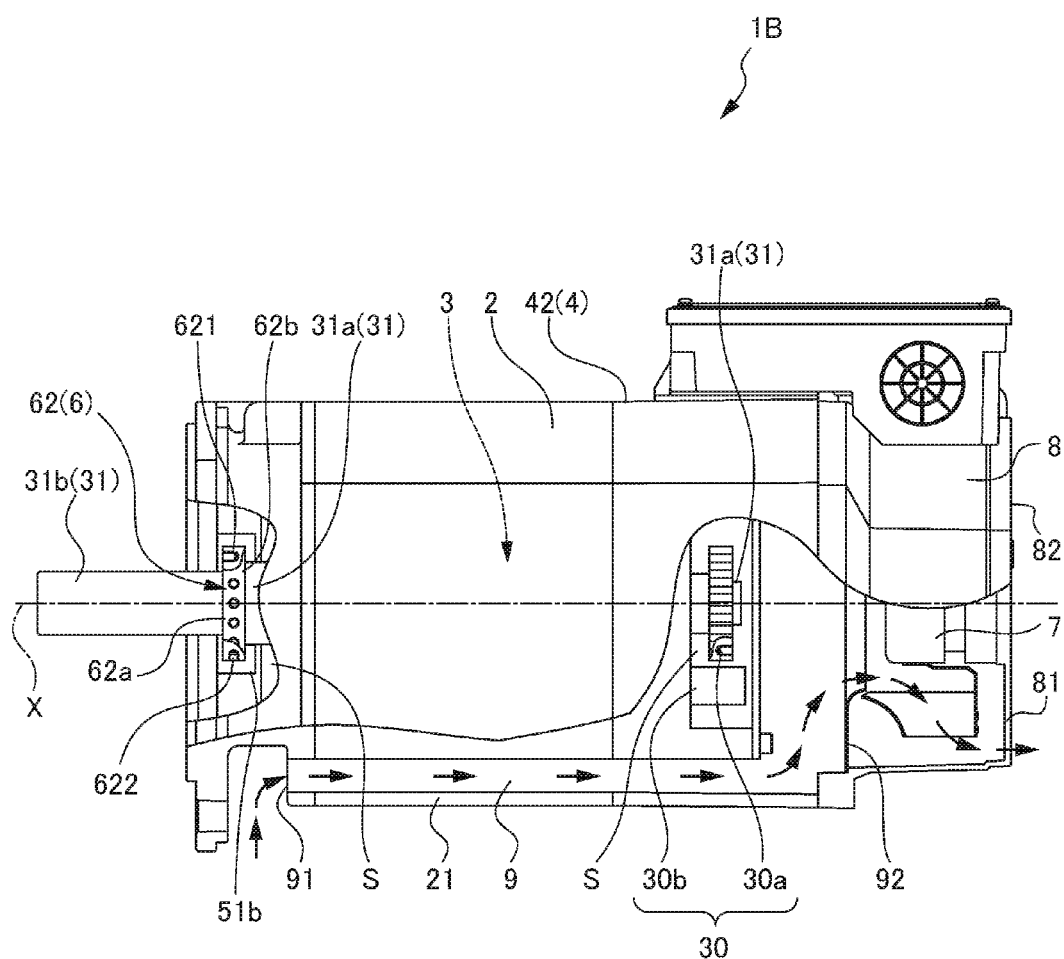
FIG. 15 is a partial sectional view of FIG. 12.
Figure 16:
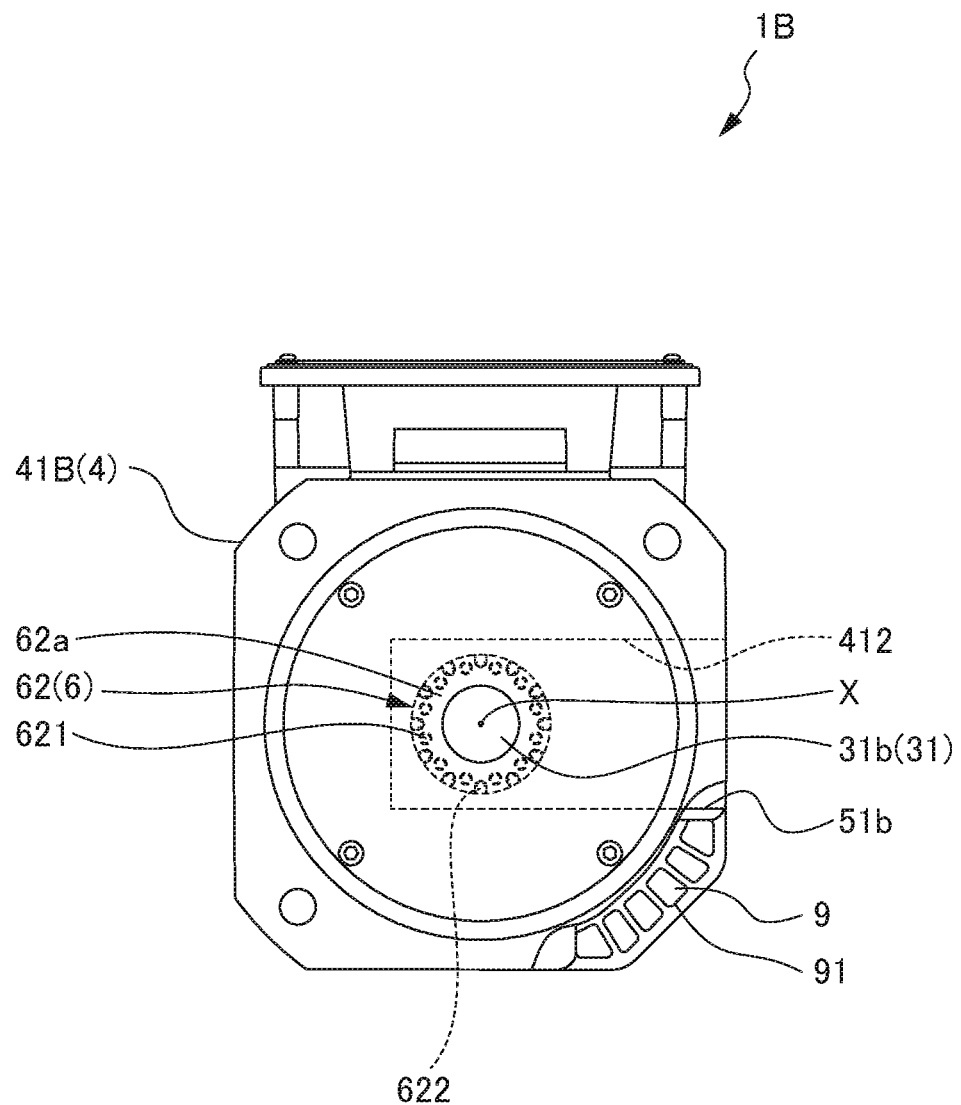
FIG. 16 is a partial sectional view of FIG. 13.
Figure 17:
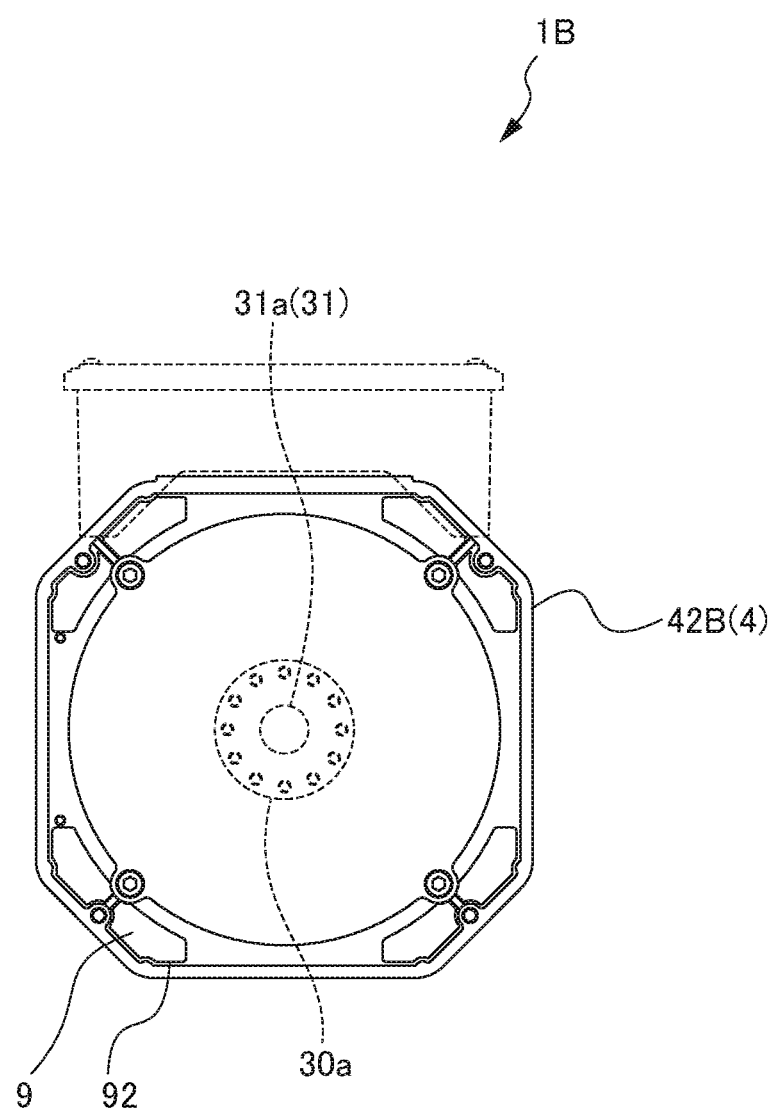
FIG. 17 is a cross-sectional view along the line C-C in FIG. 12.
Figure 18:
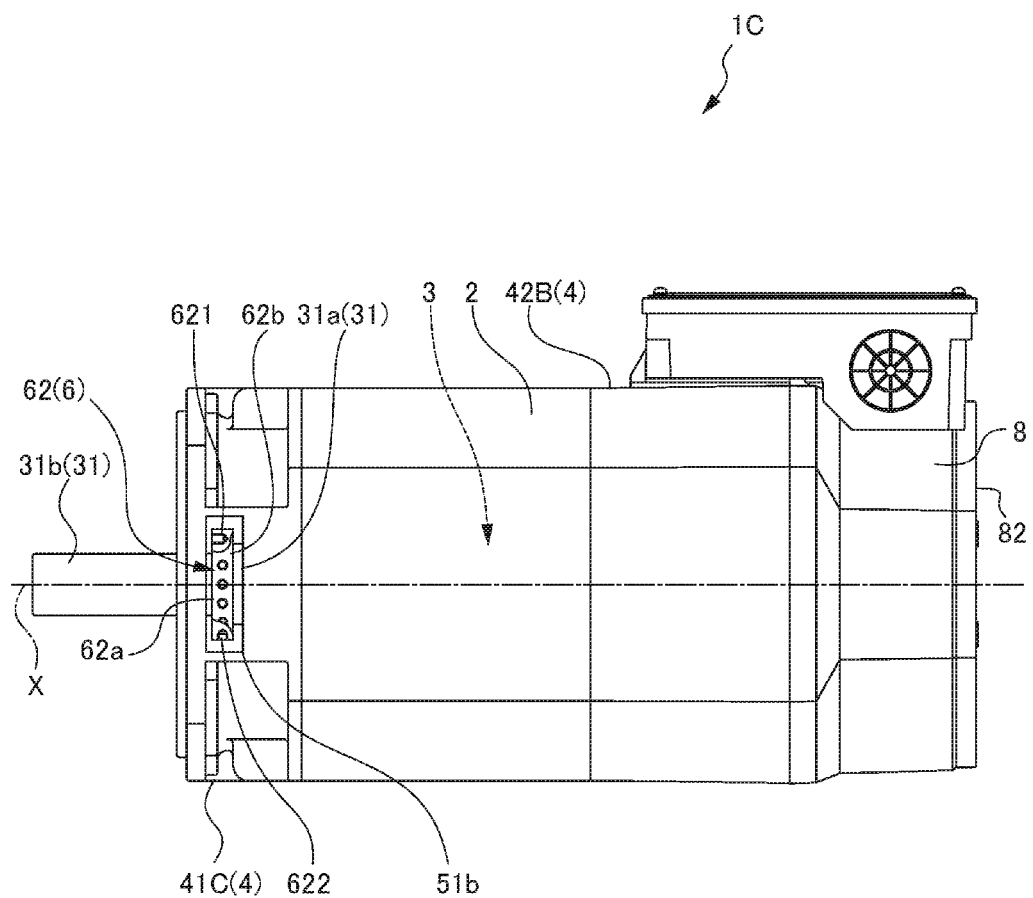
FIG. 18 is a side view of an electric motor according to a modified example of the second embodiment.
Figure 19:
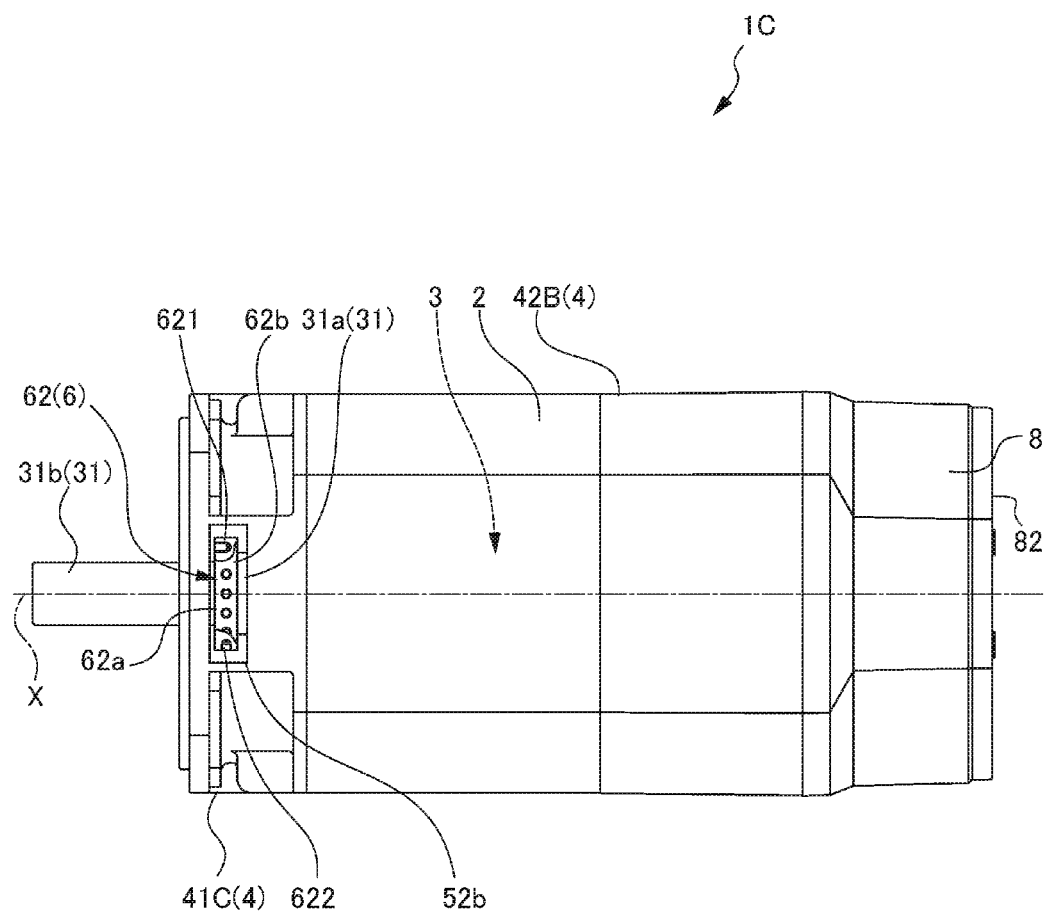
FIG. 19 is a bottom view of an electric motor according to a modified example of the second embodiment.
Figure 20:
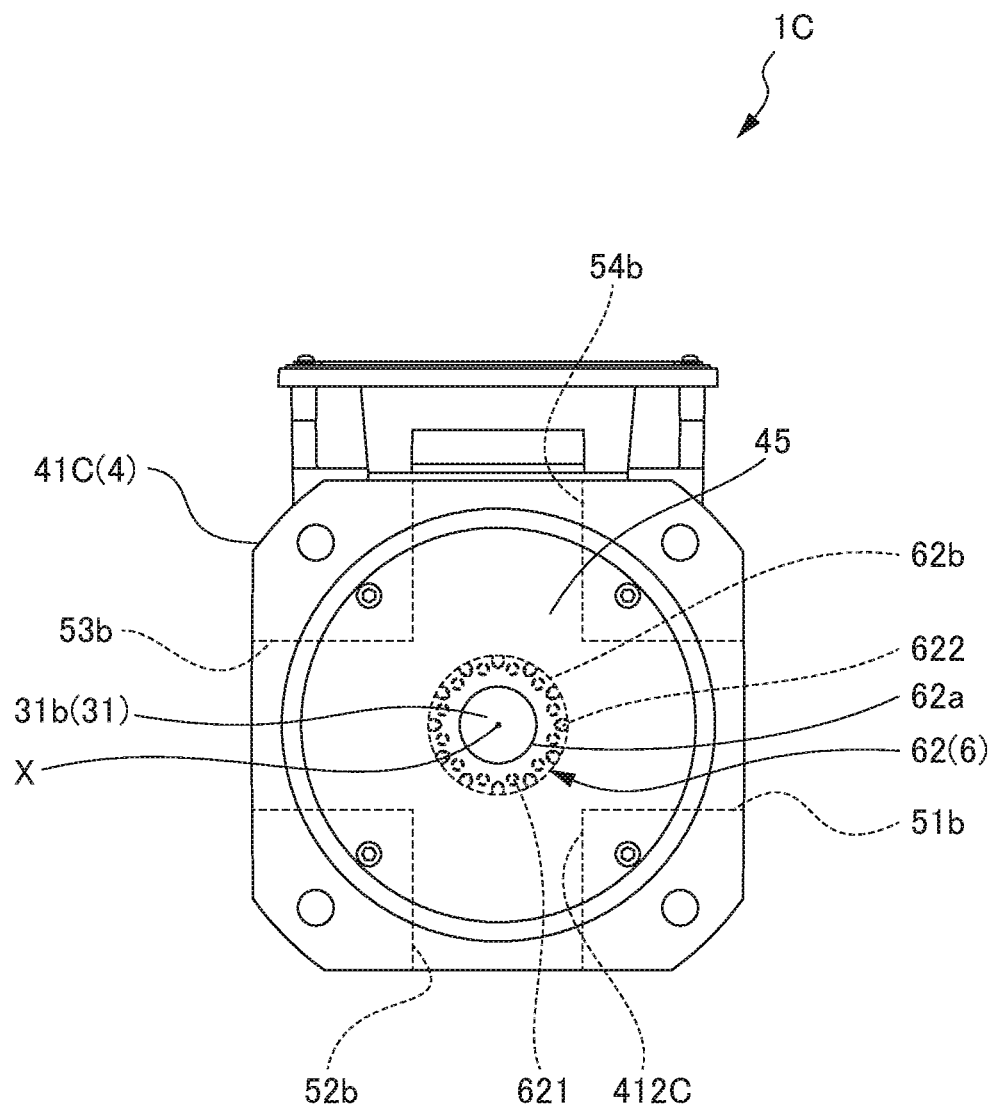
FIG. 20 is a drawing viewing the electric motor according to the modified example of the second embodiment from forward in the axial direction.
Figure 21:
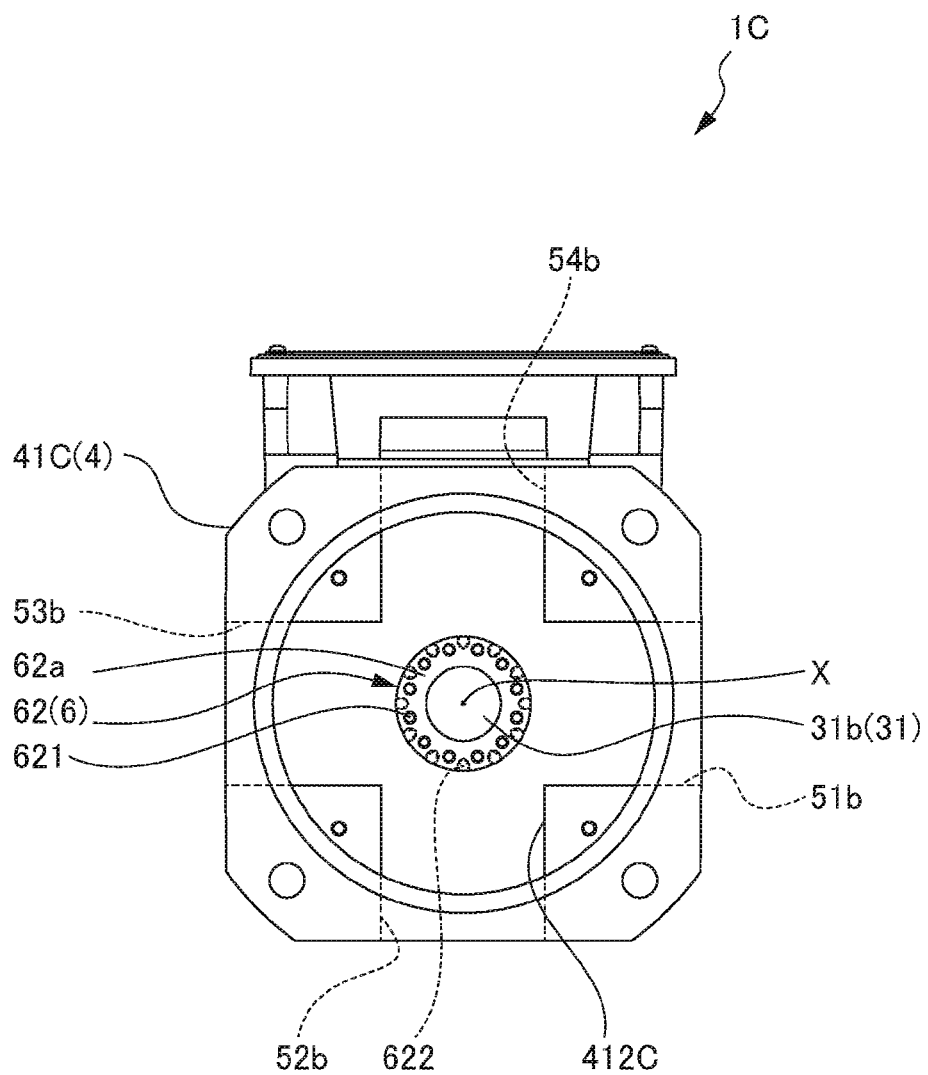
FIG. 21 is a view showing a state removing the second cover member in FIG. 20.
Figure 22:
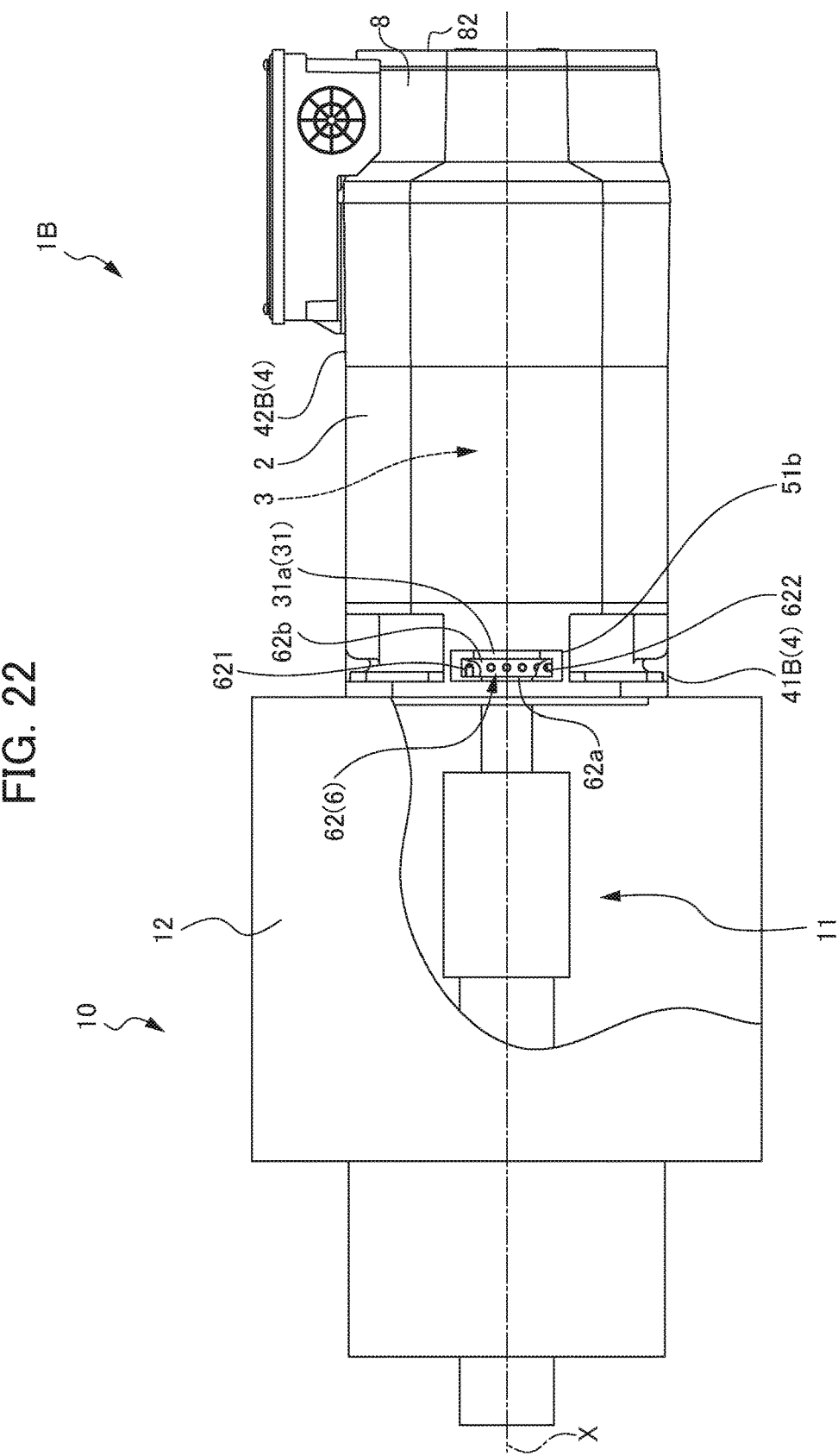
FIG. 22 is a partial sectional side view when coupling the electric motor according to the second embodiment to the spindle of a machine tool.

FIG. 12 is a side view of an electric motor 1B according to a second embodiment. FIG. 13 is a drawing viewing the electric motor 1B according to the second embodiment from forwards in the axial direction. FIG. 14 is view showing an aspect of removing a second cover member 45 in FIG. 13. FIG. 15 is a partial cross-sectional view of FIG. 12; FIG. 16 is a partial cross-sectional view of FIG. 13; and FIG. 17 is a cross-sectional view along the line C-C in FIG. 12. In addition, FIG. 18 is a side view of an electric motor 1C according to a modified example of the second embodiment. FIG. 19 is a bottom view of the electric motor 1C according to a modified example of the second embodiment. FIG. 20 is a drawing viewing the electric motor 1C according to a modified example of the second embodiment from forward in the axial direction. FIG. 21 is a view showing an aspect removing a second cover member 45 in FIG. 20. FIG. 22 is a partial cross-sectional side view when coupling the electric motor 1B according to the second embodiment to the spindle 11 of the machine tool 10.

The electric motor 1B according to the present embodiment is the same configuration as the electric motor 1 of the first embodiment, except for differing in the point of including the opening 51b in place of the opening 51a, and the point of including the second balance correction component 62 in place of the first balance correction component 61. Hereinafter, these points of difference will be explained in detail.

The opening 51b is provided in a lateral face of one side among the outer peripheral lateral faces of the front housing 41B. In a side view, the size of the bore of the opening 51b is established to be larger than the second balance correction component 62 described later. In other words, the second balance correction component 62 is exposed to the outside from the opening 51b, and becomes visible and accessible from the lateral side.

In addition, the opening 51b is formed in an end face on a forward side in the axial direction of the front housing 41B, i.e. side of a spindle mounting face 411B, by the recessed part 412 that is formed by indenting towards the rearward side in the axial direction, and accommodates the second balance correction component 62 described later, and the second cover member 45 of circular shape provided so as to cover the forward side in the axial direction of this recessed part 412 (refer to FIGS. 13 and 14). In other words, the opening 51b is separated from both the internal space S of the stator 2, and the ventilation passages 9 formed in the stator 2. The negative influences on the waterproof performance and cooling performance of the electric motor 1 are thereby avoided.

The second balance correction component 62 serving as the balance correction component 6 is mounted to the second shaft part 31b constituting the axial-direction forward portion of the rotary shaft part 31. The second balance correction component 62 has a disk shape, and is arranged coaxially with the rotary shaft part 31. It should be noted that, in FIG. 12, etc., the second balance correction component 62 is partially shown in the cross-section for convenience.

The second balance correction component 62 is a similar configuration with the first balance correction component 61 except for the orientation being basically reversed. In other words, in the end face 62a on an axial-direction forward side of the second balance correction component 62, a plurality of first taps 621 extending in the axial direction is provided at equal intervals in the circumferential direction, and the balance of the rotor 3 is corrected by adjusting the weight, number and arrangement of set screws (not illustrated) installed.

In addition, in the outer peripheral lateral face 62b of the second balance correction component 62, a plurality of second taps 622 extending in the radial direction is provided at equal intervals in the circumferential direction, and the balance of the rotor 3 is corrected by adjusting the weight, number and arrangement of set screws (not illustrated) installed.

The electric motor 1B including the above configuration is balance corrected by conducting the following, for example. First, prior to assembly of the electric motor 1B, the weight, number and arrangement of set screws installed to the first taps 621 of the second balance correction component 62 are adjusted to correct the balance of the rotor 3. Next, after assembling the electric motor 1B, the weight, number and arrangement of set screws installed to the second taps 622 are adjusted by accessing the second balance correction component 62 from the opening 51b to correct the balance of the rotor 3. In addition, even after long-term operating the electric motor 1B, it is balance corrected by way of similar operations.

The electric motor 1B including the above configuration can be modified in the number and/or arrangement of openings, as shown in FIGS. 18 to 22. In an electric motor 1C according to this modified example, openings are provided in all surfaces of the four outer peripheral lateral faces of the front housing. In other words, in both lateral faces of the front housing 41C of the electric motor 1C, an opening 51b and opening 53b are provided, an opening 52b is provided in the bottom face, and an opening 54b is provided in a top face. In a side view, for all of the openings, the size of the bore thereof is established to be larger than the second balance correction component 62. In other words, the second balance correction component 62 is exposed to the outside from all of the openings, and becomes visible and accessible from both lateral faces, the top face and the bottom face.

These openings 51b, 52b, 53b and 54b are formed at an end face at a forward side in the axial direction of the front housing 41C, i.e. side of the spindle mounting face 411C, by a recessed part 412C that is formed by indenting towards a rearward side in the axial direction in a cross shape, and accommodates the second balance correction component 62 described later in the center, and the second cover member 45 of circular shape that is provided so as to cover the forward side in the axial direction of this recessed part 412C, and are in communication with each other. In other words, all of the openings are separated from both the internal space S of the stator 2 and the ventilation passages 9 formed in the stator 2, whereby the negative influences on the waterproof performance and cooling performance of the electric motor 1 are avoided.

According to the present embodiment, similar effects to the first embodiment are exerted. In particular, according to the present embodiment, even after coupling the electric motor 1B (1C) to the spindle 11 of the machine tool 10, simple and high-precision balance correction is possible. In addition, since the opening 51b (52b, 53b, 54b) is separated from the internal space S and ventilation passages 9 of the stator 2, it is possible to avoid a decline in the waterproof performance and cooling performance of the electric motor 1B (1C).

Third Embodiment

Figure 23:
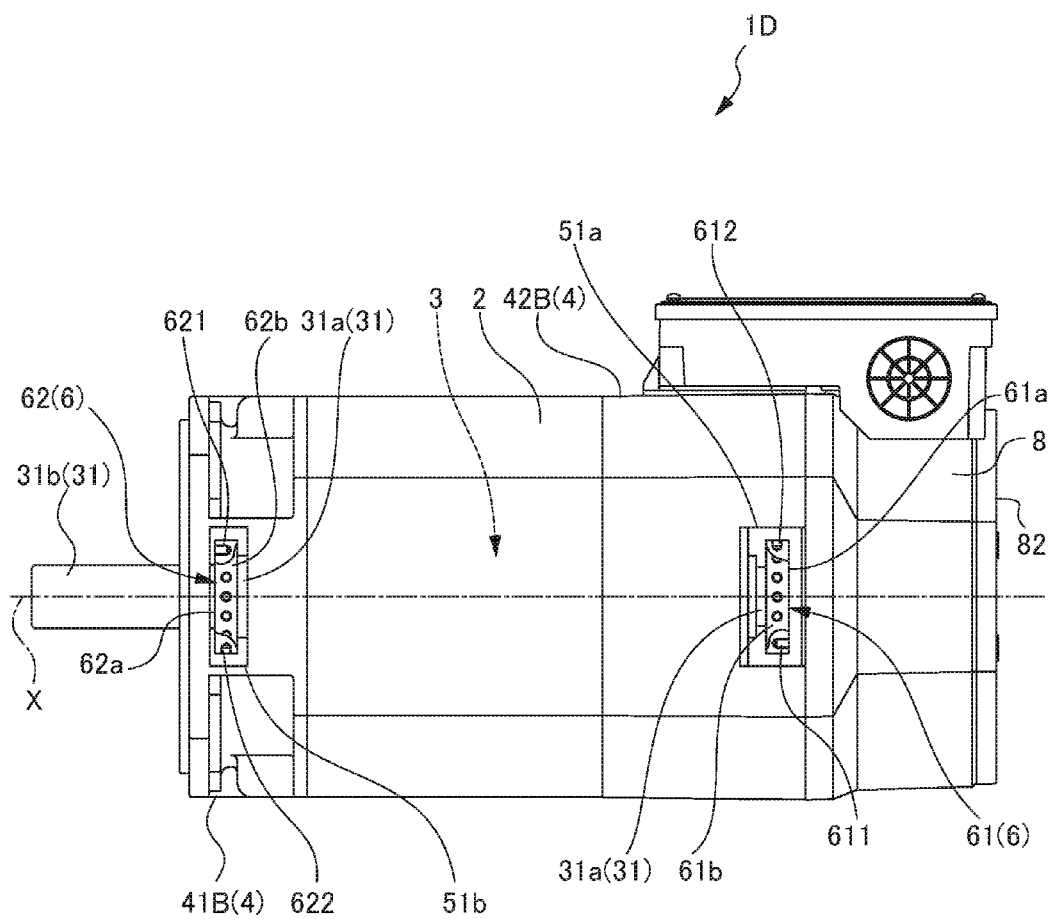
FIG. 23 is a side view of an electric motor according to a third embodiment.

FIG. 23 is a side view of an electric motor 1D according to a third embodiment. The electric motor 1D according to the present embodiment is achieved by combining the first embodiment and the second embodiment. In other words, it is the same configuration as the first embodiment and second embodiment, except for differing in the point of openings being provided in both the back housing and front housing, and the point of both of the first balance correction component 61 and the second balance correction component 62 being provided. It should be noted that, as a modified example of the present embodiment, it is possible to adopt a combination also including the modified example of the first embodiment and/or modified example of the second embodiment. According to the present embodiment including such a configuration, similar effects to the first embodiment and the second embodiment are exerted.

It should be noted that the present invention is not to be limited to the above-mentioned embodiments, and that modifications and improvements within a scope that can achieve the objects of the present invention are also included in the present invention. In the aforementioned embodiments, although the shape of the housing is established as a substantially square tubular shape, it is not limited thereto. It may be cylindrical, or may be a polygonal tube shape other than square. In addition, the opening may be provided in at least one outer peripheral lateral face in either of the front housing and back housing. In addition, the opening is not necessarily larger than the balance correction component, and it is sufficient so long as at least one tap provided to a lateral face of the balance correction component is visible and accessible.

EXPLANATION OF REFERENCE NUMERALS 1, 1A, 1B, 1C, 1D electric motor
2 stator
3 rotor
4 housing
9 ventilation passage
10 machine tool
31 rotary shaft part
41 front housing (housing)
42 back housing (housing)
51a, 52a, 53a, 51b, 52b, 53b, 54b opening
6 balance correction component
61 first balance correction component (balance correction component)
62 second balance correction component (balance correction component)
611, 621 first tap (balance correction part)
612, 622 second tap (balance correction part)

What is claimed is:

1. An electric motor comprising: a cylindrical stator; a rotor having a rotary shaft part inserted inside of the stator; a housing installed to both ends in an axial direction of the stator;
   an opening provided in at least one outer peripheral lateral face of the housing, and disposed to be separated from an internal space of the stator and a cooling ventilation passage formed in the stator; and
   a balance correction component that is installed to the rotary shaft part, and corrects balance of the rotor,
   wherein the balance correction component is exposed to outside from the opening.

2. The electric motor according to claim 1, wherein the housing is a polygonal tube shape having at least four outer peripheral lateral faces, and
   wherein the opening is provided to at least one among the four outer peripheral lateral faces.

3. The electric motor according to claim 1, wherein the balance correction component includes, at an outer peripheral lateral face thereof, a balance correction part which enables balance correction of the rotor.

4. The electric motor according to claim 2, wherein the balance correction component includes, at an outer peripheral lateral face thereof, a balance correction part which enables balance correction of the rotor.

5. The electric motor according to claim 1, wherein the balance correction component includes, at an end face in an axial direction thereof, a balance correction part which enables balance correction of the rotor.

6. The electric motor according to claim 2, wherein the balance correction component includes, at an end face in an axial direction thereof, a balance correction part which enables balance correction of the rotor.

7. The electric motor according to claim 3, wherein the balance correction component includes, at an end face in an axial direction thereof, a balance correction part which enables balance correction of the rotor.

8. The electric motor according to claim 4, wherein the balance correction component includes, at an end face in an axial direction thereof, a balance correction part which enables balance correction of the rotor.

9. A machine tool comprising the electric motor according to claim 1.

10. A machine tool comprising the electric motor according to claim 2.

11. A machine tool comprising the electric motor according to claim 3.

12. A machine tool comprising the electric motor according to claim 4.

13. A machine tool comprising the electric motor according to claim 5.

14. A machine tool comprising the electric motor according to claim 6.

15. A machine tool comprising the electric motor according to claim 7.

16. A machine tool comprising the electric motor according to claim 8.

* * * * *